United States Patent
Sato et al.

(10) Patent No.: US 9,435,649 B2
(45) Date of Patent: Sep. 6, 2016

(54) METHOD AND SYSTEM FOR AZIMUTH MEASUREMENTS USING A GYROSCOPE UNIT

(75) Inventors: Shigeru Sato, Inagi (JP); Juei Igarashi, Yokohama (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 1167 days.

(21) Appl. No.: 13/249,140

(22) Filed: Sep. 29, 2011

(65) Prior Publication Data

US 2012/0084050 A1    Apr. 5, 2012

Related U.S. Application Data

(60) Provisional application No. 61/390,148, filed on Oct. 5, 2010.

(51) Int. Cl.
G01C 21/16 (2006.01)

(52) U.S. Cl.
CPC .................... G01C 21/16 (2013.01)

(58) Field of Classification Search
CPC .... G01C 21/16; G01C 21/165; G01C 21/12; G01C 19/34; G01C 19/42; E21B 47/02; E21B 47/022; E21B 47/02216
See application file for complete search history.

(56) References Cited

U.S. PATENT DOCUMENTS

| | | | |
|---|---|---|---|
| 5,113,953 A | 5/1992 | Noble | |
| 5,265,682 A | 11/1993 | Russell et al. | |
| 5,520,255 A | 5/1996 | Barr et al. | |
| 5,553,678 A | 9/1996 | Barr et al. | |
| 5,553,679 A | 9/1996 | Thorp | |
| 5,582,259 A | 12/1996 | Barr | |
| 5,603,385 A | 2/1997 | Colebrook | |
| 5,673,763 A | 10/1997 | Thorp | |
| 5,685,379 A | 11/1997 | Barr et al. | |
| 5,695,015 A | 12/1997 | Barr et al. | |
| 5,706,905 A | 1/1998 | Barr | |
| 5,778,992 A | 7/1998 | Fuller | |
| 5,803,185 A | 9/1998 | Barr et al. | |
| 5,971,085 A | 10/1999 | Colebrook | |
| 6,089,332 A | 7/2000 | Barr et al. | |
| 6,092,610 A | 7/2000 | Kosmala et al. | |
| 6,158,529 A | 12/2000 | Dorel | |
| 6,244,361 B1 | 6/2001 | Comeau et al. | |
| 6,364,034 B1 | 4/2002 | Schoeffler | |
| 6,394,193 B1 | 5/2002 | Askew | |
| 7,712,223 B2 * | 5/2010 | Imamura et al. | 33/318 |
| 7,801,704 B2 * | 9/2010 | Sato et al. | 702/189 |
| 2001/0052428 A1 | 12/2001 | Larronde et al. | |
| 2002/0011359 A1 | 1/2002 | Webb et al. | |

OTHER PUBLICATIONS

Naval Surface Warfare Center titled "A Method for Calculating Exact Geodetic Latitude and Altitude" by Isaac Sofair, Apr. 1985 (revised Mar. 1993).

* cited by examiner

*Primary Examiner* — Manuel L Barbee

(74) *Attorney, Agent, or Firm* — Daryl R. Wright; Jody DeStefanis

(57) ABSTRACT

Methods and systems for azimuth measurements using a gyroscope unit are disclosed. The method includes acquiring a ratio value between two earth rate components orthogonal to each other by using the gyroscope unit at a measuring position; acquiring three gravity vector components orthogonal to each other at the measuring position; and determining an azimuth with respect to a reference axis predetermined in the gyroscope unit, based on the ratio value, the three gravity vector components and a geodetic latitude of the measuring position.

8 Claims, 13 Drawing Sheets

METHOD AND SYSTEM FOR AZIMUTH MEASUREMENTS USING A GYROSCOPE UNIT

RELATED APPLICATION(S)

This patent claims priority from U.S. Provisional Application Ser. No. 61/390,148 entitled "Method and System for Azimuth Measurements Using a Gyroscope Unit" and filed on Oct. 5, 2010. U.S. Provisional Application Ser. No. 61/390,148 is hereby incorporated by reference in its entirety.

FIELD OF THE INVENTION

The present invention relates to techniques of azimuth measurements using a gyroscope unit in downhole, for example, for azimuth measurements during Measurement-While-Drilling (MWD), Logging-While-Drilling (LWD), and wireline logging operations. More particularly, the invention relates to measurements of the earth rate vector direction for azimuth determination with at least one gyroscope and three accelerometers.

BACKGROUND OF THE INVENTION

Azimuth measurement technology in downhole is mostly categorized into measurements with magnetometers and measurements with gyroscopes. The former uses triad magnetometers to measure earth magnet field. However, the magnetometers can be used only in the place without any magnetic influence by magnetic materials like a casing. The latter uses gyroscopes to measure the earth rate vector direction for azimuth determination. The gyroscope measurements are hardly influenced by magnetic field. Therefore, the gyroscope can be used near or in such a casing of magnetic materials.

To determine azimuth using the earth rate in downhole, three earth rate components are usually measured with three orthogonal axis gyroscopes. The three components can determine the earth rate vector in the sensor coordinates system in any attitude angle. If the two sensor axes lie on the horizontal plane, a ratio of the two components can determine north and thence azimuth. North is a projection direction of the earth rate vector onto the horizontal plane. If a single-axis gyroscope rotates its input axis on the horizontal plane about the vertical axis, it can measure two orthogonal components. In this case, it is not necessary even to calibrate the scale factor if only the direction of the projection vector is measured.

It is advantageous to use relatively low grade gyroscopes like MEMS (Micro-Electro Mechanical Systems) gyroscopes because of its low cost, small size and high environmental reliability. Today the performance of MEMS gyroscopes is approaching that of conventional high grade gyroscopes such as optical fiber gyroscopes. However, the MEMS gyroscopes show still too low bias stability to measure the earth rate in a strap-down configuration. To cancel out the bias error, the input axis direction needs to be flipped. If a flipping mechanism is also capable of pointing the input axis to various angular orientations, a single-axis gyroscope can determine two orthogonal earth rate components as described in U.S. Pat. No. 7,712,223 issued on May 11, 2010 and pending U.S. patent application Ser. No. 12/233,592 filed on Sep. 19, 2008. The U.S. Pat. No. 7,712,223 and U.S. patent application of No. 12/240,943 are incorporated herein by reference in its entirety.

The method using the flipping mechanism, however, requires a plane including two orthogonal axes to be kept horizontal. If the plane tilts, the relationship between the two measured earth rate components and north becomes non-trivial. Therefore, three orthogonal components of the earth rate vector must be measured to enable the measurement system to tilt at any direction and any angles. Such system needs more complex mechanism to flip the gyroscope for canceling the bias and/or to point the input axis to various angular orientations for measuring all the three earth rate components. The mechanism makes the sensor package larger and less reliable in spite of small size and high reliability of the MEMS gyroscope. The mechanism may also cause uncertain misalignment errors due to its mechanical tolerances. If only a single axis gyroscope suffices to determine azimuth, these disadvantages could be reduced and new applications would be expected. Therefore, it is beneficial if the restriction that the measurement plane must be kept horizontal is eliminated.

BRIEF SUMMARY OF THE INVENTION

In one aspect of the present invention, a method for azimuth measurements using a gyroscope unit is provided. The method comprises acquiring a ratio value between two earth rate components orthogonal to each other by using the gyroscope unit at a measuring position; acquiring three gravity vector components orthogonal to each other at the measuring position; and determining an azimuth with respect to a reference axis predetermined in the gyroscope unit, based on the ratio value, the three gravity vector components and a geodetic latitude of the measuring position.

In aspects herein, determining the azimuth with respect to the reference axis may comprise determining a horizontal plane vertical to a gravity direction determined based on the three gravity vector components; determining a normalized earth rate projection vector on a measurement coordinate plane based on the ratio value, the measurement coordinate plane being defined by coordinate axes predetermined in the gyroscope unit; determining an earth rate plane vertical to the measurement coordinate plane so that a first intersection line between the earth rate plane and the measurement coordinate plane is parallel to the earth rate projection vector; determining a north direction on the horizontal plane, based on the earth rate plane and the geodetic latitude; and determining the azimuth by calculating an angle between the north direction and a projection vector of the reference axis projected onto the horizontal plane.

In aspects disclosed herein, determining the north direction may comprise determining a vertical plane vertical to the horizontal plane; determining a second intersection line between the vertical plane and the earth rate plane; determining a third intersection line between the vertical plane and the horizontal plane; and determining a direction along the third intersection line as the north direction where an angle between the second intersection line and the third intersection line equals to the geodetic latitude.

In aspects herein, the azimuth may be determined by using:

$$\sigma = \pm \delta \pm \varepsilon(\lambda)$$

$$= \pm \arccos\left(\frac{G_Z \Omega'_x}{\sqrt{(1-G_x^2)(G_z^2 + (G_x\Omega'_x + G_y\Omega'_y)^2)}}\right) \pm$$

$$\arccos\left(\sqrt{\frac{(G_y\Omega'_x - G_x\Omega'_y)^2 - \cos(\lambda)^2}{\cos(\lambda)^2[(G_y\Omega'_x - G_x\Omega'_y)^2 - 1]}}\right)$$

where X-axis and Y-axis of an orthogonal coordinates system are defined for measuring the two earth rate components, the X-axis is set as the reference axis, δ represents an angle between the projection of X-axis onto the horizontal plane and a fourth intersection line between the earth rate plane and the horizontal plane, $\epsilon$ represents an angle between the third intersection line and the fourth intersection line, $\sigma$ represents the azimuth, $\Omega'_x$, and $\Omega'_y$ represent components along the X-axis and the Y-axis of the normalized earth rate projection vector on an X-Y plane as the measurement coordinate plane, $G_x$, $G_y$ and $G_z$ represent the normalized gravity vector components, and $\lambda$ represents the geodetic latitude having a plus value in the Northern Hemisphere and a minus value in the Southern Hemisphere. Furthermore, the azimuth may be determined by using one of equations (30-1)-(30-8) listed in Table I, based on conditions for selecting an azimuth formula with respect to a normal unit vector $P_\Omega$ of the earth rate plane, a unit gravity vector G, a unit vector $L_{O\_d}$ of the fourth intersection line, and a unit vector X' of the X-axis projected onto the horizontal plane. The two earth rate components may be measured by a single gyroscope rotatable to align an input axis to each of two axes orthogonal to each other. One of the two earth rate components may be measured by a first gyroscope with an input axis aligned to a first axis and the other earth rate component may be measured by a second gyroscope with an input axis aligned to a second axis orthogonal to the first axis. The gyroscope unit may comprise one or two MEMS-type gyroscope.

In yet another aspect of the present invention, the disclosure provides a system for azimuth measurements. The system comprises a housing; a gyroscope unit including one or two gyroscopes; three orthogonal axis accelerometers; a data processing unit; and a power supply unit. The data processing unit comprises a computer having a processor and a memory. The memory stores a program having instructions for acquiring a ratio value between two earth rate components orthogonal to each other by using the gyroscope unit at a measuring position; acquiring three gravity vector components orthogonal to each other at the measuring position; and determining an azimuth with respect to a reference axis predetermined in the gyroscope unit, based on the ratio value, the three gravity vector components and a geodetic latitude of the measuring position.

In understanding the scope of the present invention, the term "geodetic latitude" as used herein means an angle from the equatorial plane to the vertical direction of a line normal to the ellipsoid through a given point when assuming the earth as the ellipsoid in shape, as described in the report of Naval Surface Warfare Center titled "A Method for Calculating Exact Geodetic Latitude and Altitude" by Isaac Sofair, April 1985 (revised March 1993). This report is incorporated herein by reference in its entirety.

Additional advantages and novel features of the invention will be set forth in the description which follows or may be learned by those skilled in the art through reading the materials herein or practicing the invention. The advantages of the invention may be achieved through the means recited in the attached claims.

BRIEF DESCRIPTION OF THE DRAWINGS

The accompanying drawings illustrate preferred embodiments of the present invention and are a part of the specification. Together with the following description, the drawings demonstrate and explain principles of the present invention.

Figure 1:
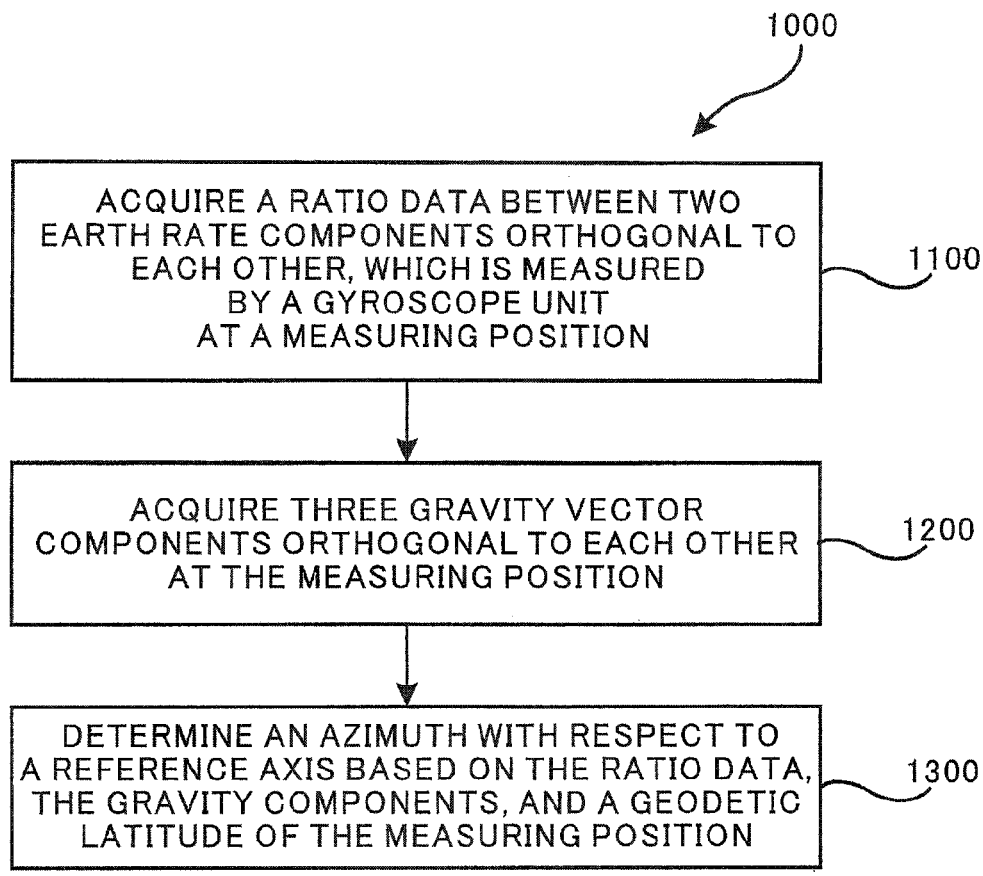
FIG. 1 is a flow chart of one exemplary method of measuring azimuth using a gyroscope unit according to the disclosure herein.

Throughout the drawings, identical reference numbers indicate similar, but not necessarily identical elements. While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the scope of the invention as defined by the appended claims.

DETAILED DESCRIPTION OF THE INVENTION

Illustrative embodiments and aspects of the present disclosure are described below. In the interest of clarity, not all features of an actual implementation are described in the specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such development effort might be complex and time-consuming, but would nevertheless be a routine undertaking for those of ordinary skill in the art having benefit of the disclosure herein.

In one of exemplary applications of methods and systems for azimuth measurements using a gyroscope unit according to the disclosure herein, it is possible for a single gyroscope to determine azimuth in a wide range of attitude of a downhole system used in a wellbore with respect to gravity direction. The azimuth measurements are based on the following fact that, in ordinary navigation systems, a mobile object is supposed to move in a wide area, where geodetic latitude may not be constant. In downhole applications, however, a well length may be several kilo meters only. Even though almost part of the well trajectory is horizontal, geodetic latitude change will be approximately ±0.02 degrees at most and can be regarded constant. The constraint, a constant geodetic latitude, enables to determine the earth rate vector direction with two orthogonal earth rate components in a tilt plane.

FIG. 1 illustrates one embodiment of a method of measuring azimuth for wellbore survey using an inertial sensor apparatus such as gyroscope unit and accelerometers included in a downhole system according to the disclosure herein. The method 1000 begins by acquiring a ratio value between two earth rate components orthogonal to each other by using the gyroscope unit at a measuring position apparatus in a wellbore or on the ground, as set forth in the box 1100. The two earth rate components are measured by a single gyroscope rotatable to align an input axis to each of two axes orthogonal to each other. In other embodiments, one of the two earth rate components may be measured by a first gyroscope with an input axis aligned to a first axis and the other earth rate component may be measured by a second gyroscope with an input axis aligned to a second axis orthogonal to the first axis. One or two MEMS (microelectromechanical systems)-type gyroscopes may be used in the gyroscope unit.

The method 1000 continues, as set forth in the box 1200, by acquiring three gravity vector components orthogonal to each other at the measuring position. The three gravity vector components may be measured by using three orthogonal axis accelerometers. Then, as set forth in the box 1300, the method 1000 concludes, in this particular embodiment, by determining an azimuth with respect to a reference axis predetermined in the gyroscope unit, based on the ratio value, the three gravity vector components and a geodetic latitude ($\lambda$) of the measuring position. The reference axis may be defined in a system including the gyroscope unit and the three orthogonal axis accelerometers.

Figure 2:
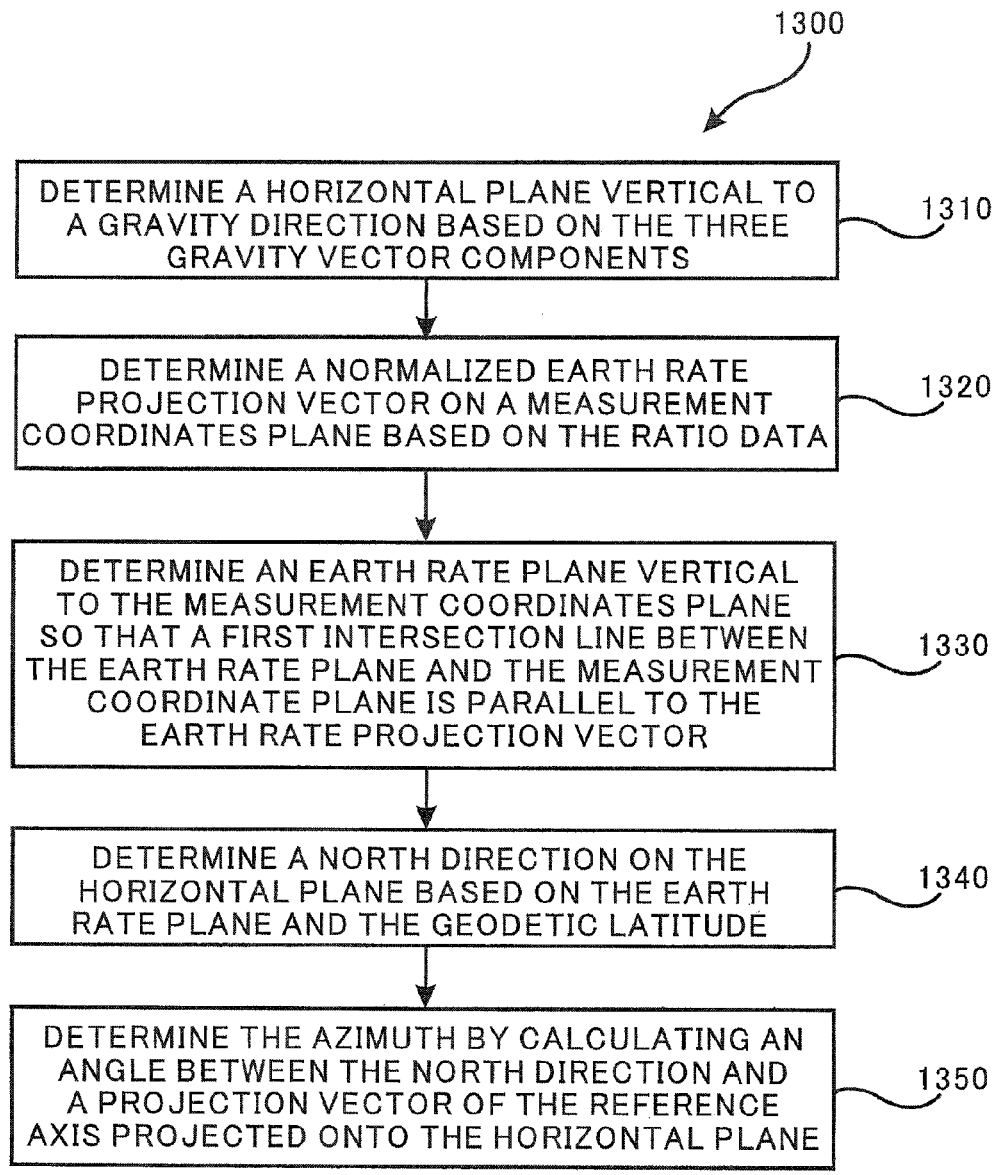
FIG. 2 is a flow chart of one exemplary steps of determining the azimuth with respect to a reference axis according to the disclosure herein.

FIG. 2 is a flow chart of one exemplary steps of determining the azimuth with respect to a reference axis set forth in the box 1300 of FIG. 1. The step 1300 of determining the azimuth begins by determining a horizontal plane vertical to a gravity direction determined based on the three gravity vector components, as set forth in the box 1310. The step 1300 continues, as set forth in the box 1320, by determining a normalized earth rate projection vector $\Omega'$ on a measurement coordinate plane based on the ratio value. The measurement coordinate plane is defined by coordinate axes predetermined in the gyroscope unit, such as an X-Y plane of an orthogonal X, Y, Z coordinates system predetermined in the downhole system.

The step 1300 continues, as set forth in the box 1330, by determining an earth rate plane ($\Omega$ plane) vertical to the measurement coordinate plane so that a first intersection line between the earth rate plane and the measurement coordinate plane is parallel to the earth rate projection vector ($\Omega'$). Then, the step 1300 continues, as set forth in the boxes 1340 and 1350, by determining a north direction (N) on the horizontal plane, based on the earth rate plane ($\Omega$ plane) and the geodetic latitude ($\lambda$), and determining the azimuth by calculating an angle between the north direction and a projection vector of the reference axis projected onto the horizontal plane.

Figure 3:
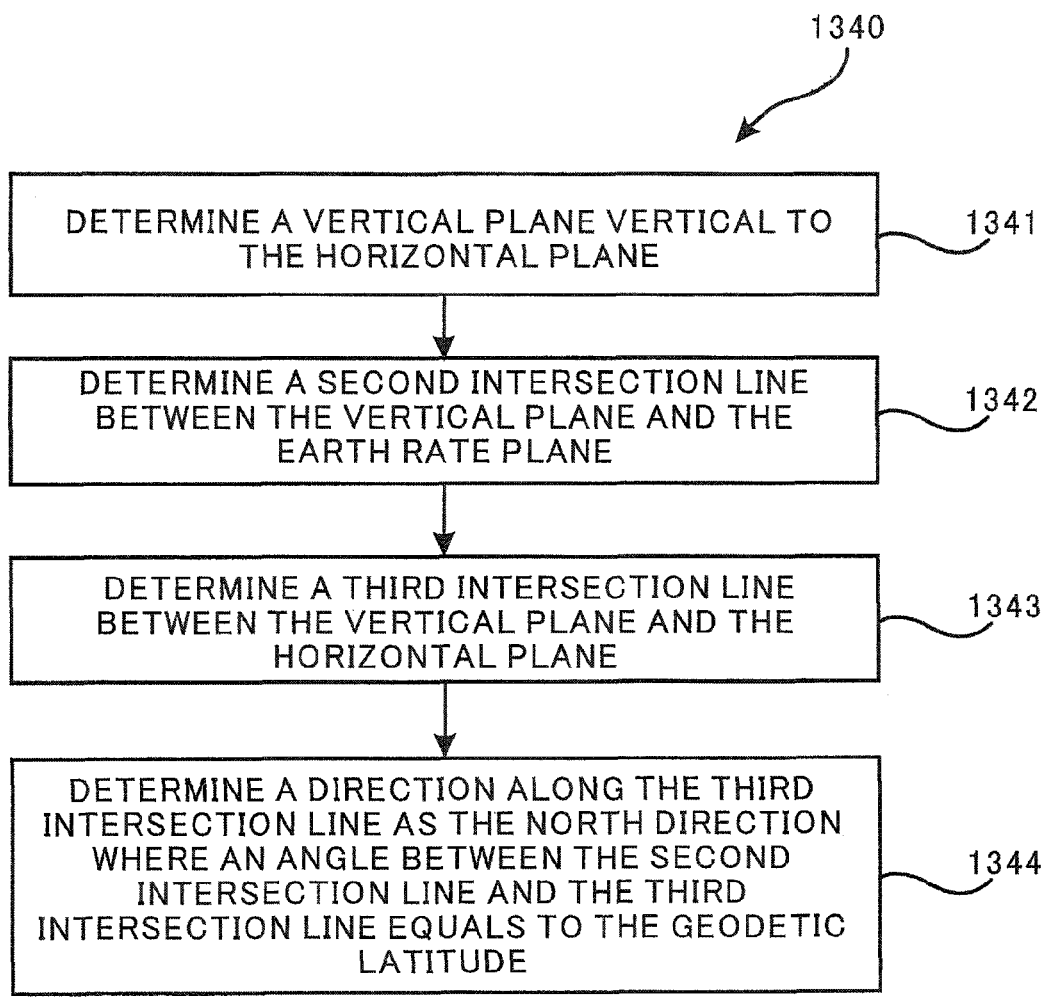
FIG. 3 is a flow chart of one exemplary steps of determining the north direction according to the disclosure herein.

FIG. 3 is a flow chart of one exemplary steps of determining the north direction set forth in the box 1340 of FIG. 2. The step 1340 of determining the north direction begins by determining a vertical plane vertical to the horizontal plane, as set forth in the box 1341. The step 1340 continues, as set forth in the boxes 1342 and 1343, by determining a second intersection line between the vertical plane and the earth rate plane ($\Omega$ plane), and determining a third intersection line between the vertical plane and the horizontal plane. Then, as set forth in the box 1344, the step 1340 concludes by determining a direction along the third intersection line as the north direction where an angle between the second intersection line and the third intersection line equals to the geodetic latitude ($\lambda$).

In one embodiment of methods and systems for azimuth measurements according to the disclosure herein, it is assumed that a downhole tool mounts a single axis gyroscope with an input axis parallel to X-Y plane which is one of coordinate planes of an orthogonal XYZ coordinates system predetermined in the downhole tool. The input axis is rotatable in the X-Y plane about Z-axis as the aforementioned measurement coordinate plane to measure earth rate ($\Omega$) components at various angular orientations. The Z-axis may be defined to be the longitudinal axis of the downhole tool. By fitting a sinusoidal curve to the measured data on the plot of the earth rate components versus the angular orientations, an earth rate vector projection $\Omega'$ on the X-Y plane can be determined. The earth rate vector projection $\Omega'$ is an earth rate vector projected onto the X-Y plane. In this embodiment, the sensor scale factor of the gyroscope may not be well calibrated just to determine the direction of the earth rate vector. However, the present method according to the disclosure herein is applicable to any type of gyroscopes that can measure two orthogonal earth rate components.

The direction of the earth rate vector projection $\Omega'$ on the X-Y plane is determined by using an ratio data between two earth rate components along X-axis and Y-axis measured with a gyroscope unit at a measuring position. The tilt angle of the X-Y plane is measured with three-orthogonal axis accelerometers. Geodetic latitude ($\lambda$) at the measuring position is known. The azimuth is determined with such given information of the ratio data, the tilt angle of the X-Y plane, and the geodetic latitude ($\lambda$) of the measuring position. The azimuth is defined as an angle between north direction and an X-axis projection onto a horizontal plane vertical to gravity direction in the applications. The X-axis is a reference axis for azimuth measurements, which is predetermined in the XYZ coordinates system of the downhole tool.

Figure 4:
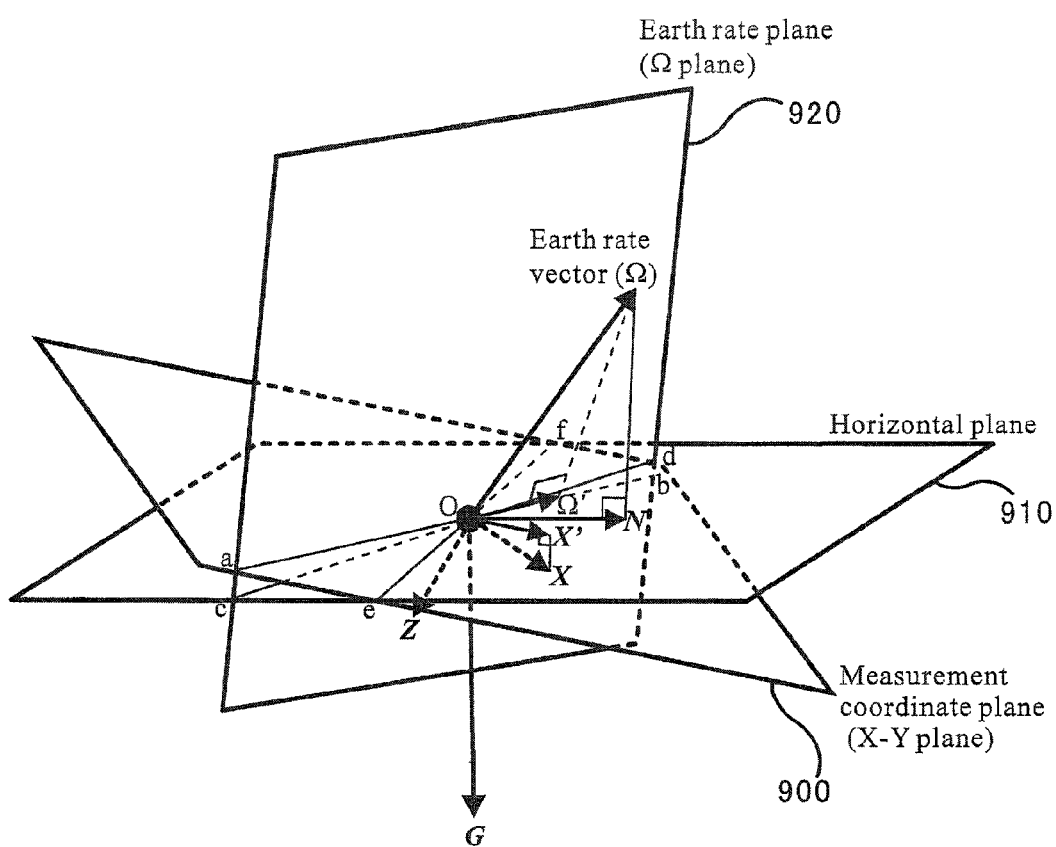
FIG. 4 is an illustration showing a geometric configuration of the azimuth measurements according to the disclosure herein.

FIG. 4 shows a geometric configuration of a model for deriving an algorism and formula to calculate the azimuth values. Knowing a earth rate projection vector $\Omega'$, we make an $\Omega$ plane (earth rate plane) 920 vertical to the X-Y plane 900. The line of intersection a-b as the first intersection line is parallel to the earth rate projection vector $\Omega'$. The $\Omega$ plane should contain the earth rate vector $\Omega$ in it. The $\Omega$ plane intersects with the horizontal plane 910 on the line of intersection c-d as the fourth intersection line. The line of e-f is the intersection between the X-Y plane 900 and the horizontal plane 910.

Figure 5:
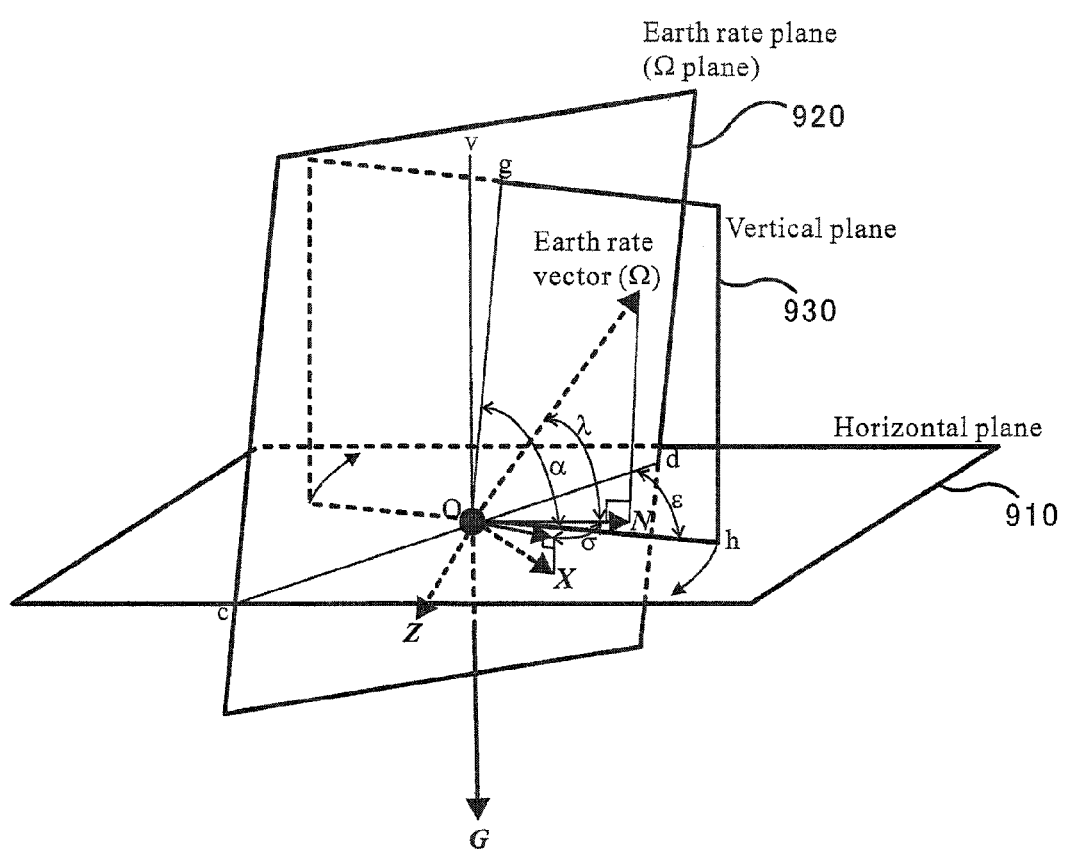
FIG. 5 is an illustration showing a geometric configuration of determining the north direction by rotating the vertical pane according to the disclosure herein.

For determining a north direction in the model, a vertical plane 930 rotatable about the vertical line O-v is defined as shown in FIG. 5. The vertical plane 930 intersects with the $\Omega$ plane (earth rate plane) 920 at a second intersection line of O-g and with the horizontal plane 910 at a third intersection line O-h. The angle between the second intersection line O-g and the third intersection line O-h is denoted by α. Determining a north direction is to search for a direction of the third intersection line O-h where α=λ by rotating the vertical plane 930 about the vertical line O-v. The angle of λ can be determined from the geodetic latitude of the measuring position.

In this model, azimuth is defined as the angle σ between the north direction N and the projection vector of the X-axis (reference axis) on the horizontal plane 910. The algorism and formula are derived by assuming that the measuring position is located in the Northern Hemisphere of the earth, and then the developed algorithm and formula are adopted to the Southern Hemisphere.

In the present model, the algorism and formula for calculating the azimuth values are derived with following mathematics using three-dimensional vector algebra. A plane is denoted as a normal vector of the plane and a line is denoted as a direction vector. Only directions of lines and planes are considered and vector magnitudes have no meaning in the derivation of algorism and formula. All vectors are normalized to be unit vectors eventually.

The horizontal plane 910 is expressed with a normal unit vector $P_h$ as follows:

$$P_h = G, \quad (1)$$

where G is the normalized gravity vector.

The X-Y plane (measurement coordinate plane) 900 is expressed with a normal unit vector $P_{X-Y}$ as follows:

$$P_{X-Y} = Z, \quad (2)$$

where Z is the unit vector parallel to the Z-axis.

The Ω plane (earth rate plane) 920 is expressed with a normal unit vector $P_\Omega$ as follows:

$$P_\Omega = P_{X-Y} \times \Omega' = Z \times \Omega', \quad (3)$$

where the symbol x represents outer product. The fourth intersection line c-d denoted by $L_{O\_d}$ between the horizontal plane 910 and the Ω plane 920 is expressed with as follows:

$$L_{O\_d} = P_\Omega \times P_h = (Z \times \Omega') \times G. \quad (4)$$

Making a vertical plane 930 parallel to the fourth intersection line c-d (See FIG. 5), the vertical plane 930 is expressed with a normal unit vector $P_V$ as follows:

$$P_V = P_h \times L_{O\_d} = G \times ((Z \times \Omega') \times G). \quad (5)$$

Rotating the vertical plane 930 about the vertical line O-v, the third intersection line between the vertical plane 930 and the horizontal plane 910 rotates on the vertical plane 930. The rotating line, i.e. the third intersection line, is denoted by $L_{O\_h}$ as follows:

$$L_{O\_h} = R * L_{O\_d} = R * [(Z \times \Omega') \times G], \quad (6)$$

where R is a rotation operator, which rotates a vector about G vector.

Therefore, the third intersection line, $L_{O\_h}$ is expressed as follows:

$$L_{O\_h} = R * [((Z \times \Omega') \times G)] \quad (7)$$
$$= R * [(Z \cdot G)\Omega' - (\Omega' \cdot G)Z]$$
$$= (Z \cdot G)R * [\Omega'] - (\Omega' \cdot G)R * [Z].$$

The normal unit vector of the rotating vertical plane, $P_V'$ is calculated by multiplying G to the right side of the formula (7), as follows:

$$P_V' = P_h \times L_{O\_h} \quad (8)$$
$$= G \times \{(Z \cdot G)R * [\Omega'] - (\Omega' \cdot G)R * [Z]\}$$
$$= (Z \cdot G)G \times (R * [\Omega']) - (\Omega' \cdot G)G \times (R * [Z]).$$

The rotating vertical plane intersects with the Ω plane 920 at the second intersection line O-g, denoted by $L_{O\_g}$. The second intersection line $L_{O\_g}$ is expressed as follows:

$$L_{O\_g} = P_V' \times P_\Omega \quad (9)$$
$$= [(Z \cdot G)G \times (R * [\Omega']) - (\Omega' \cdot G)G \times (R * [Z])] \times (Z \times \Omega')$$
$$= (Z \cdot G)(G \times (R * [\Omega'])) \times (Z \times \Omega') - (\Omega' \cdot G)(G \times (R * [Z])) \times$$
$$(Z \times \Omega')$$
$$= (Z \cdot G)((G \cdot ((R * [\Omega']) \times \Omega'))Z - (G \cdot ((R * [\Omega']) \times Z))\Omega') -$$
$$[(\Omega' \cdot G)(G \cdot ((R * [Z]) \times \Omega' \cdot)Z - (G \cdot ((R * [Z]) \times Z))\Omega')]$$
$$= \{(Z \cdot G)(G \cdot ((R * [\Omega']) \times \Omega')) - (\Omega' \cdot G)(G \cdot ((R * [Z]) \times \Omega' \cdot))\}Z -$$
$$\{(Z \cdot G)(G \cdot ((R * [\Omega']) \times Z)) - (\Omega' \cdot G)(G \cdot ((R * [Z]) \times Z))\}\Omega'$$

It is noted that if the vertical plane 930 does not rotate, the second intersection line $L_{O\_g}$ should be parallel to the fourth intersection line $L_{O\_}^d$. In fact, $$L_{O\_g} = \{(Z \cdot G)(G \cdot ((R * [\Omega']) \times \Omega')) - (\Omega' \cdot G)G \cdot ((R * [Z]) \times \Omega' \cdot)\}Z - \quad (10)$$
$$\{(Z \cdot G)(G \cdot ((R * [\Omega']) \times Z)) - (\Omega' \cdot G)(G \cdot ((R * [Z]) \times Z))\}\Omega'$$
$$= -(\Omega' \cdot G)G \cdot (Z \times \Omega' \cdot)Z - (Z \cdot G)(G \cdot (\Omega' \times Z))\Omega'$$
$$= G \cdot (Z \times \Omega' \cdot)\{(Z \cdot G)\Omega' - (\Omega' \cdot G)Z\}$$
$$= G \cdot (Z \cdot \Omega' \cdot)L_{O\_d}$$
$$= const \times L_{O\_d}.$$

The angle ϵ between the third intersection lines O-h and the second intersection line O-g is calculated from inner product of the vectors of those lines. The inner product of formulas (4) and (6) is expressed as follows:

$$L_{O-h} \cdot L_{O-g} = |L_{O-h}| \cdot |L_{O-g}| \cos(\alpha) \quad (11)$$
$$= \{(Z \cdot G)R * [\Omega'] - (\Omega' \cdot G)R * [Z]\} \cdot$$
$$\left\{ \begin{array}{l} \left\{ \begin{array}{l} (Z \cdot G)(G \cdot ((R * [\Omega']) \times \Omega')) - \\ (\Omega' \cdot G)G \cdot ((R * [Z]) \times \Omega' \cdot) \end{array} \right\} Z - \\ \left\{ \begin{array}{l} (Z \cdot G)(G \cdot ((R * [\Omega']) \times Z)) - \\ (\Omega' \cdot G)(G \cdot ((R * [Z]) \times Z)) \end{array} \right\} \Omega' \end{array} \right\}$$
$$= (Z \cdot G)\left\{ \begin{array}{l} (Z \cdot G)(G \cdot ((R * [\Omega']) \times \Omega')) - \\ (\Omega' \cdot G)G \cdot ((R * [Z]) \times \Omega' \cdot) \end{array} \right\} R * [\Omega'] \cdot Z -$$
$$(Z \cdot G)\left\{ \begin{array}{l} (Z \cdot G)(G \cdot ((R * [\Omega']) \times Z)) - \\ (\Omega' \cdot G)(G \cdot ((R * [Z]) \times Z)) \end{array} \right\} R * [\Omega'] \cdot \Omega' -$$
$$(\Omega' \cdot G)\left\{ \begin{array}{l} (Z \cdot G)(G \cdot ((R * [\Omega']) \times \Omega')) - \\ (\Omega' \cdot G)G \cdot ((R * [Z]) \times \Omega' \cdot) \end{array} \right\} R * [Z] \cdot Z +$$
$$(\Omega' \cdot G)\left\{ \begin{array}{l} (Z \cdot G)(G \cdot ((R * [\Omega']) \times Z)) - \\ (\Omega' \cdot G)(G \cdot ((R * [Z]) \times Z)) \end{array} \right\} R * [Z] \cdot \Omega'.$$

To determine the angle ϵ satisfying λ=α, it is necessary to solve the equation (11) for ϵ. It is possible to facilitate the solution by rewriting the equation (11) in terms of the unit vector components of earth rate and gravity. Each term of the equation (11) as follows:

$$(Z \cdot G) = G_z.  \quad (12)$$

$$(\Omega' \cdot G) = \Omega'_x G_x + \Omega'_y G_y  \quad (13)$$

The rotation operation is usually expressed in terms of Euler angles. It leads, however, to too complicated expressions. The vector algebra is rather convenient and used herein.

If the rotation angle, $\epsilon$, is infinitesimal, the rotation operator, a rotated vector Z' would be calculated with a rotation vector R, as follows:

$$Z' = R*[Z] = Z + R \times Z.  \quad (14)$$

Figure 6:
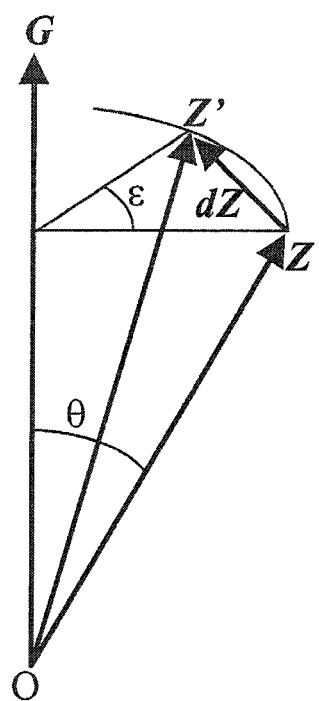
FIG. 6 is an illustration showing a rotation operation with an infinitesimal rotation angle $\epsilon$ according to the disclosure herein.

However, the rotation angle, $\epsilon$, is usually finite in this case. So the equation (14) has to be modified. In fact, dZ is not R×Z in FIG. 6.

Figure 7:
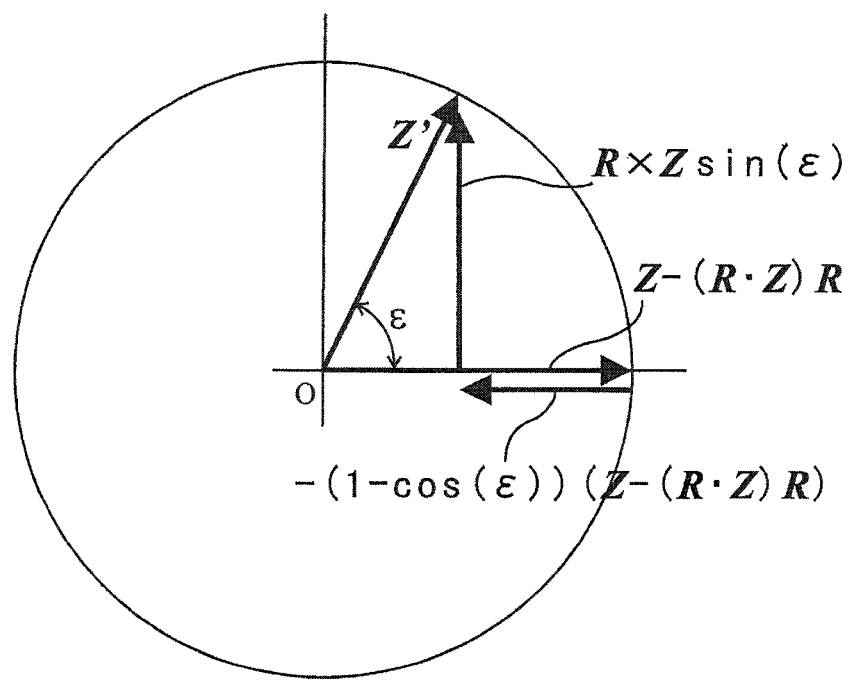
FIG. 7 is an illustration showing a modified rotation operation according to the disclosure herein.

By using two vectors of R×Z sin(ε) and $-(1-\cos(\epsilon))(Z-(R \cdot Z)R)$ instead of dZ, as shown in FIG. 7, the equation (14) is modified as follows:

$$Z' = R*[Z] = Z - (1 - \cos(\varepsilon))(Z - (G \cdot Z)G) + \sin(\varepsilon)G \times Z \quad (15)$$

$$= \cos(\varepsilon)Z + (1 - \cos(\varepsilon))(G \cdot Z)G + \sin(\varepsilon)G \times Z.$$

To compute the inner product of the third intersection line $L_{O\text{-}h}$ and the second intersection line $L_{O\text{-}g}$, each term in the equations (9) and (11) need to be rewritten in terms of the measurement coordinate system (orthogonal XYZ coordinates system) under the following conditions:

$$Z = \begin{pmatrix} 0 \\ 0 \\ 1 \end{pmatrix}, G = \begin{pmatrix} G_x \\ G_y \\ G_z \end{pmatrix} \text{ and } \Omega' = \begin{pmatrix} \Omega'_x \\ \Omega'_y \\ 0 \end{pmatrix},  \quad (16)$$

where $|G| = 1$, then $G_x^2 + G_y^2 + G_z^2 = 1$, $|\Omega'| = 1$, then $\Omega'^2_x + \Omega'^2_y = 1$.

$$Z' = R*[Z] = \cos(\varepsilon)Z + (1 - \cos(\varepsilon))(G \cdot Z)G + \sin(\varepsilon)G \times Z$$

$$= \cos(\varepsilon)\begin{pmatrix} 0 \\ 0 \\ 1 \end{pmatrix} + (1 - \cos(\varepsilon))G_z\begin{pmatrix} G_x \\ G_y \\ G_z \end{pmatrix} + \sin(\varepsilon)\begin{pmatrix} G_y \\ -G_x \\ 0 \end{pmatrix}$$

$$= \begin{pmatrix} (1 - \cos(\varepsilon))G_zG_x + \sin(\varepsilon)G_y \\ (1 - \cos(\varepsilon))G_zG_y - \sin(\varepsilon)G_x \\ \cos(\varepsilon) + (1 - \cos(\varepsilon))G_z^2 \end{pmatrix}$$

$$(\Omega')' = R*[\Omega']  \quad (17)$$

$$= \cos(\varepsilon)\Omega' + (1 - \cos(\varepsilon))(G \cdot \Omega')G + \sin(\varepsilon)G \times \Omega'$$

$$= \cos(\varepsilon)\begin{pmatrix} \Omega'_x \\ \Omega'_y \\ 0 \end{pmatrix} + (1 - \cos(\varepsilon))(\Omega'_x G_x + \Omega'_y G_y)\begin{pmatrix} G_x \\ G_y \\ G_z \end{pmatrix} +$$

$$\sin(\varepsilon)\begin{pmatrix} -G_z\Omega'_y \\ G_z\Omega'_x \\ -G_y\Omega'_x + G_x\Omega'_y \end{pmatrix}$$

$$= \begin{pmatrix} \cos(\varepsilon)\Omega'_x - \sin(\varepsilon)G_z\Omega'_y + \\ (1 - \cos(\varepsilon))G_x(\Omega'_x G_x + \Omega'_y G_y) \\ \cos(\varepsilon)\Omega'_y + \sin(\varepsilon)G_z\Omega'_x + \\ (1 - \cos(\varepsilon))G_y(\Omega'_x G_x + \Omega'_y G_y) - \\ G_y\Omega'_x + \sin(\varepsilon)G_x\Omega'_y + \\ (1 - \cos(\varepsilon))G_z(\Omega'_x G_x + \Omega'_y G_y) \end{pmatrix}.$$

$$G \cdot ((R*[\Omega']) \times \Omega') = -\sin(\varepsilon)\begin{vmatrix} (G_x\Omega'_y - G_y\Omega'_x)^2 - \\ G_z^2(\Omega'^2_x + \Omega'^2_y) \end{vmatrix}.  \quad (18)$$

$$G \cdot ((R*[Z]) \times \Omega' \cdot) =  \quad (19)$$
$$G_x(\sin(\varepsilon)G_z\Omega'_x - \cos(\varepsilon)\Omega'_y) + G_y(\cos(\varepsilon)\Omega'_x + \sin(\varepsilon)G_z\Omega'_y).$$

$$G \cdot ((R*[\Omega']) \times Z) =  \quad (20)$$
$$G_x(\sin(\varepsilon)G_z\Omega'_x + \cos(\varepsilon)\Omega'_y) + G_y(-\cos(\varepsilon)\Omega'_y + \sin(\varepsilon)G_z\Omega'_x).$$

$$G \cdot ((R*[Z]) \times Z) = -\sin(\varepsilon)(G_x^2 + G_y^2).  \quad (21)$$

Using the rewritten equations, the third intersection line $L_{O\text{-}h}$ and the second intersection line $L_{O\text{-}g}$ can be calculated as follows:

$$L_{O\text{-}h} = (Z \cdot G)R*[\Omega'] - (\Omega' \cdot G)R*[Z]  \quad (22)$$

$$= \begin{pmatrix} -\sin(\varepsilon)G_xG_y\Omega'_x + \cos(\varepsilon)G_z\Omega'_x - \\ \sin(\varepsilon)(G_y^2 + G_z^2)\Omega'_y \\ \sin(\varepsilon)(G_x^2 + G_z^2)\Omega'_x + \\ (\sin(\varepsilon)G_xG_y + \cos(\varepsilon)G_z)\Omega'_y \\ \sin(\varepsilon)G_z(-G_y\Omega'_x + G_x\Omega'_y) - \\ \cos(\varepsilon)(G_x\Omega'_x + G_y\Omega'_y) \end{pmatrix}.$$

$$L_{O\text{-}g} = \left\{ \begin{matrix} (Z \cdot G)(G \cdot ((R*[\Omega']) \times \Omega')) - \\ (\Omega' \cdot G)(G \cdot ((R*[Z]) \times \Omega' \cdot)) \end{matrix} \right\}Z -  \quad (24)$$

$$\left\{ \begin{matrix} (Z \cdot G)(G \cdot ((R*[\Omega']) \times Z)) - \\ (\Omega' \cdot G)(G \cdot ((R*[Z]) \times Z)) \end{matrix} \right\}\Omega'$$

$$= \begin{pmatrix} \Omega'_x\begin{bmatrix} \cos(\varepsilon)G_z(G_y\Omega'_x - G_x\Omega'_y) - \\ \sin(\varepsilon)(G_x\Omega'_x + G_x\Omega'_y) \end{bmatrix} \\ \Omega'_y\begin{bmatrix} \cos(\varepsilon)G_z(G_y\Omega'_x - G_x\Omega'_y) - \\ \sin(\varepsilon)(G_x\Omega'_x + G_x\Omega'_y) \end{bmatrix} - \\ \sin(\varepsilon)G_z + \cos(\varepsilon)(-G_y\Omega'_x + G_x\Omega'_y)(G_x\Omega'_x + G_x\Omega'_y) \end{pmatrix}.$$

Then, the inner product of $L_{O\text{-}h}$ and $L_{O\text{-}g}$ is expressed as follows:

$$L_{O\text{-}h} \cdot L_{O\text{-}g} = (G_y\Omega'_x - G_x\Omega'_y)\{(G_x\Omega'_x + G_y\Omega'_y)^2 + G_z^2\}.  \quad (25)$$

Norm of $L_{O\text{-}h} \cdot L_{O\text{-}g}$ is $$|L_{O\text{-}h}| \cdot |L_{O\text{-}g}| =  \quad (26)$$
$$\sqrt{[\sin(\varepsilon)^2 + \cos(\varepsilon)^2(G_y\Omega'_x - G_x\Omega'_y)^2]} \, [(G_x\Omega'_x + G_y\Omega'_y)^2 + G_z^2].$$

Consequently the equation to solve for $\epsilon$ where $\alpha = \lambda$ is expressed as follows:

$$\cos(\lambda) = \frac{L_{O\text{-}h} \cdot L_{O\text{-}g}}{|L_{O\text{-}h}||L_{O\text{-}g}|} = \frac{(G_y\Omega'_x - G_x\Omega'_y)}{\sqrt{[\sin(\varepsilon)^2 + \cos(\varepsilon)^2(G_y\Omega'_x - G_x\Omega'_y)^2]}}.  \quad (27)$$

It is noted that if $\epsilon = 0$, the intersection lines $L_{O\text{-}h}$ and $L_{O\text{-}g}$ should be parallel to each other and the angle $\alpha$ would be zero.

In fact, $$\cos(\alpha) = \frac{L_{O-h} \cdot L_{O-g}}{|L_{O-h}||L_{O-g}|} = \frac{(G_y\Omega'_x - G_x\Omega'_y)}{\sqrt{(G_x\Omega'_y - G_y\Omega'_x)^2}} = 1 \quad (28)$$

Hence, $\alpha=0$.

Squaring the both sides of the equation (27) to solve it for $\epsilon$ are expressed as follows:

$$\cos(\lambda)^2[\sin(\epsilon)^2+\cos(\epsilon)^2(G_y\Omega_x-G_x\Omega'_y)^2]=(G_y\Omega'_x-G_x\Omega'_y)^2,$$

$$\cos(\lambda)^2[1-\cos(\epsilon)^2+\cos(\epsilon)^2(G_y\Omega'_x-G_x\Omega'_y)^2]=(G_y\Omega'_x-G_x\Omega'_y)^2,$$

$$\cos(\lambda)^2\{(G_y\Omega'_x-G_x\Omega'_y)^2-1\}\cos(\epsilon)^2-(G_y\Omega'_x-G_x\Omega'_y)+\cos(\lambda)^2=0.$$

Solving the equation for $\epsilon$, two solutions are obtained as follows:

$$\cos[\varepsilon(\lambda)] = \pm\sqrt{\frac{(G_y\Omega'_x - G_x\Omega'_y)^2 - \cos(\lambda)^2}{\cos(\lambda)^2[(G_y\Omega'_x - G_x\Omega'_y)^2 - 1]}}. \quad (29)$$

Then, $$\varepsilon(\lambda) = \pm\arccos\left(\sqrt{\frac{(G_y\Omega'_x - G_x\Omega'_y)^2 - \cos(\lambda)^2}{\cos(\lambda)^2[(G_y\Omega'_x - G_x\Omega'_y)^2 - 1]}}\right).$$

The angle $\epsilon$ expressed with the equation (29) can be either positive or negative here because Arccosine function does not discriminate the sign. In the present applications, it is necessary to decide the sign by considering something else such as the slope of $\Omega$ plane independently.

To determine azimuth defined as the angle $\sigma$ between an X-axis projection and an earth rate vector projection on the horizontal plane 910, It is necessary to know the angle between X-axis projection and the second intersection line between the $\Omega$ plane 920 and the horizontal plane 910.

The X-axis projection onto the horizontal plane is denoted by X' as follows:

$$X'=X-(X\cdot G)G$$

The angle between the X-axis projection X' and the fourth intersection line $L_{O\_d}$ is expressed as follows:

$$\delta = \varepsilon(\lambda) + \sigma = \pm\arccos\left(\frac{X' \cdot L_{O\_d}}{|X'||L_{O\_d}|}\right)$$

$$\delta = \pm\arccos\left(\frac{G_z\Omega'_x}{\sqrt{(1-G_x^2)(G_z^2 + (G_x\Omega'_x + G_y\Omega'_y)^2)}}\right).$$

X-axis projection

Consequently azimuth is expressed as follows:

$$\sigma = \pm\delta \pm \varepsilon(\lambda) \quad (30)$$

$$= \pm\arccos\left(\frac{G_z\Omega'_x}{\sqrt{(1-G_x^2)(G_z^2 + (G_x\Omega'_x + G_y\Omega'_y)^2)}}\right) \pm$$

$$\arccos\left(\sqrt{\frac{(G_y\Omega'_x - G_x\Omega'_y)^2 - \cos(\lambda)^2}{\cos(\lambda)^2[(G_y\Omega'_x - G_x\Omega'_y)^2 - 1]}}\right).$$

under the conditions expressed following equations:

if $G_z \geq 0$, if $(L_{O\_d} \times X') \cdot G \geq 0$, if $P_\Omega \cdot G \geq 0$, then $\sigma = \delta - \epsilon$, if, $P_\Omega \cdot G > 0$, then $\sigma = \delta + \epsilon$, if $(L_{O\_d} \times X') \cdot G < 0$, if $P_\Omega \cdot G \geq 0$, then $\sigma = 360° - (\delta + \epsilon)$ if, $P_\Omega \cdot G < 0$, then $\sigma = 360° - (\delta - \epsilon)$ if $G_z < 0$, if $(L_{O\_d} \times X') \cdot G \geq 0$, if $P_n \cdot G > 0$, then $\sigma = 180° + (\delta + \epsilon)$, if, $P_\Omega \cdot G < 0$, then $\sigma = 180° + (\delta - \epsilon)$ if $(L_{O\_d} \times X') \cdot G < 0$, if $P_\Omega \cdot G \geq 0$, then $\sigma = 180° - (\delta - \epsilon)$ if, $P_\Omega \cdot G < 0$, then $\sigma = 180° - (\delta + \epsilon)$.

Table I shows a list of azimuth formulas under the aforementioned conditional equation for selecting an azimuth formula with respect to a normal unit vector $P_\Omega$ of the earth rate plane, a unit gravity vector G, a unit vector $L_{O\_d}$ of the fourth intersection line, and a unit vector X' of the X-axis projected onto the horizontal plane. Azimuth can be determined by using one of equations (30-1)-(30-8) listed in Table I, based on the conditional equations.

TABLE I

|  | Azimuth formula | Conditional equations for selecting an azimuth formula | | |
|---|---|---|---|---|
| (30-1) | $\sigma = \delta + \epsilon$ | $P_\Omega \cdot G < 0$ | $(L_{O\_d} \times X') \cdot G \geq 0$ | $G_Z < 0$ |
| (30-2) | $\sigma = \delta - \epsilon$ | $P_\Omega \cdot G \geq 0$ | $(L_{O\_d} \times X') \cdot G \geq 0$ | $G_Z < 0$ |
| (30-3) | $\sigma = 180° + (\delta - \epsilon)$ | $P_\Omega \cdot G < 0$ | $(L_{O\_d} \times X') \cdot G \geq 0$ | $G_Z \geq 0$ |
| (30-4) | $\sigma = 180° + (\delta + \epsilon)$ | $P_\Omega \cdot G \geq 0$ | $(L_{O\_d} \times X') \cdot G \geq 0$ | $G_Z \geq 0$ |
| (30-5) | $\sigma = 180° - (\delta + \epsilon)$ | $P_\Omega \cdot G < 0$ | $(L_{O\_d} \times X') \cdot G < 0$ | $G_Z < 0$ |

TABLE I-continued

| | Azimuth formula | Conditional equations for selecting an azimuth formula | | |
|---|---|---|---|---|
| (30-6) | $\sigma = 180° - (\delta - \epsilon)$ | $P_\Omega \cdot G \geq 0$ | $(L_{O\_d} \times X') \cdot G < 0$ | $G_Z < 0$ |
| (30-7) | $\sigma = 360° - (\delta - \epsilon)$ | $P_\Omega \cdot G < 0$ | $(L_{O\_d} \times X') \cdot G < 0$ | $G_Z \geq 0$ |
| (30-8) | $\sigma = 360° - (\delta + \epsilon)$ | $P_\Omega \cdot G \geq 0$ | $(L_{O\_d} \times X') \cdot G < 0$ | $G_Z \geq 0$ |

Figure 8:
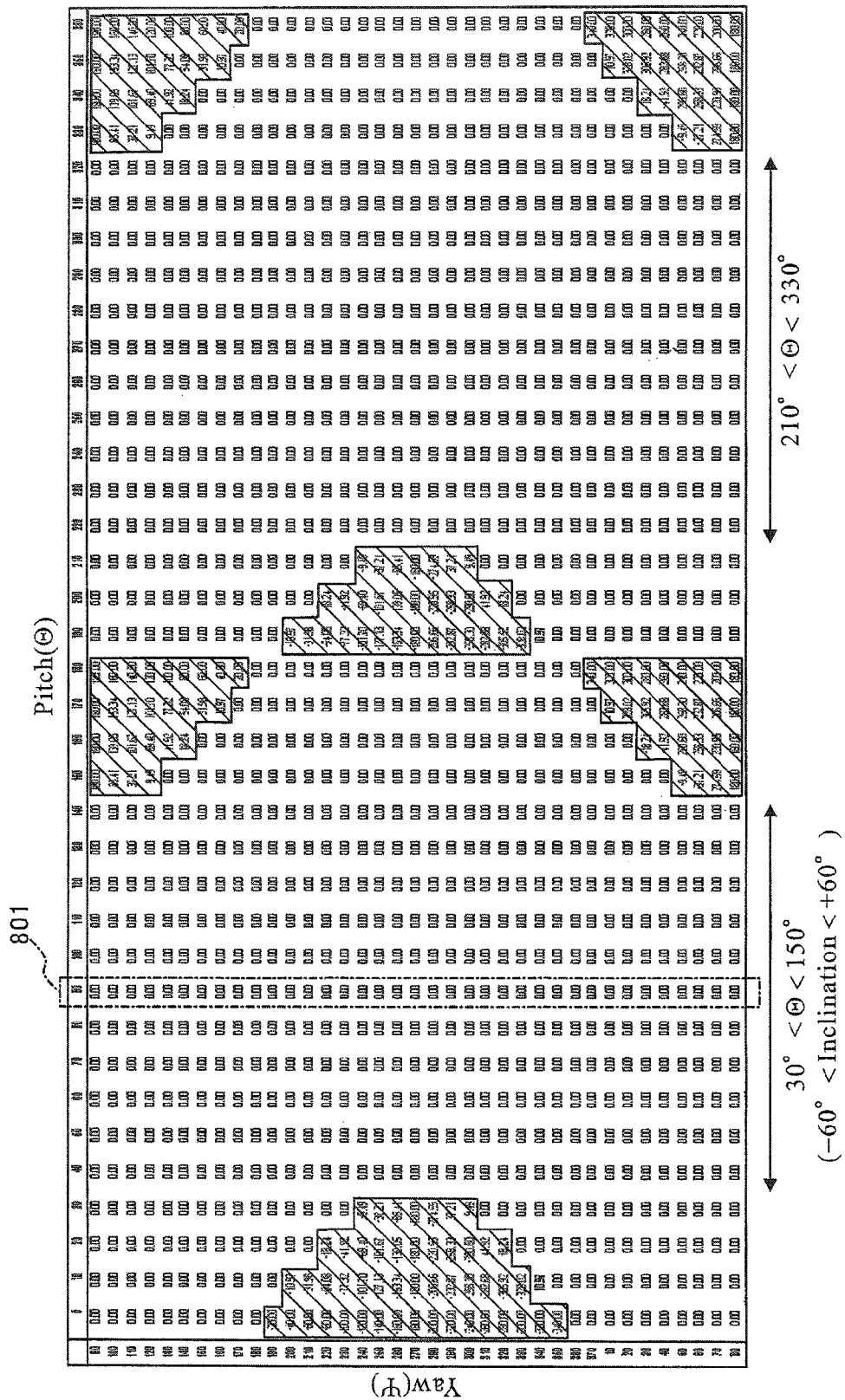
FIG. 8 is a list of one exemplary simulation result of calculating azimuth error with respect to various yaw ($\Psi$) angles and pitch ($\Theta$) angles according to the disclosure herein.
Figure 9:
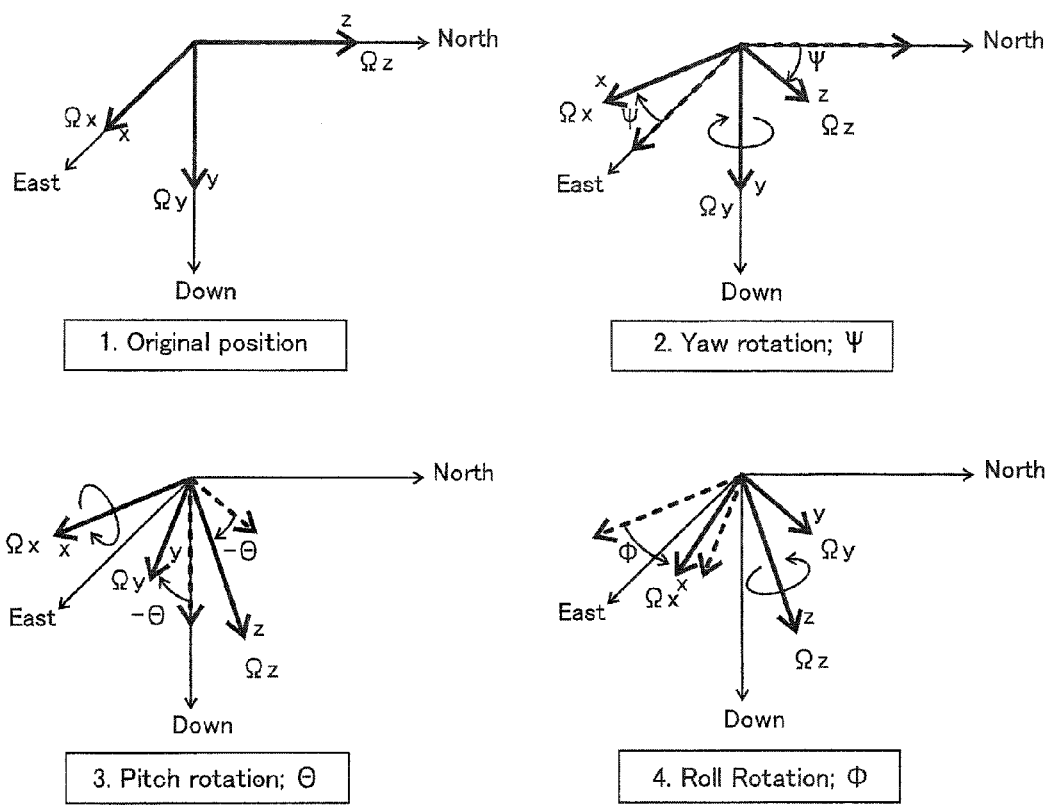
FIG. 9 is an illustration showing a definition of rotation angles ($\Psi$, $\Theta$, $\Phi$) according to the disclosure herein.

FIG. 8 shows a list of one exemplary simulation result of calculating azimuth error with respect to entire ranges of Yaw ($\Psi$) angles and Pitch ($\Theta$) angles at Roll ($\Phi$)=0° and $\lambda$=35°. The azimuth error are calculated as "Azimuth—True Azimuth". The Azimuth is calculated using the azimuth formula (30) and the conditional equations. The Yaw ($\Psi$) angle, Pitch ($\Theta$) angle and Roll ($\Phi$) angle are defined as illustrated in FIG. 9.

The True Azimuth can be calculated using the earth rate vector $\Omega$ and X-axis projection vector, X' onto the horizontal plane as follows:

$$\text{North} = \Omega - (\Omega \cdot G)G. \quad (31)$$

$$TrueAzimuth = \arccos\left(\frac{X' \cdot \text{North}}{|X'||\text{North}|}\right).$$

The hatched areas in FIG. 8 show the data with no-zero errors and the other data in non-hatched area represent no error, 0. The data indicated in the box 801 are computed under the condition where the minus Z-axis is oriented to gravity at $\Theta$=90°. The downhole tool can be inclined within ±50° and turned upside down although it is not expected. The error ranges in the hatched areas surrounded with solid lines corresponds to the range where one more conditional parameter "$L_{O\_d} \cdot \Omega$" is not specified in this simulation. The sign of $L_{O\_d} \cdot \Omega$ can eliminate the non-zero error range but it is impossible to use the condition "$L_{O\_d} \cdot \Omega$" because $\Omega$ is the target to be measured and an unknown value until the azimuth is determined. It is also noted that the error ranges is caused by the combination of signs of the two angles of 6 and c, not their values, which are computed correctly.

The conditional equations used for this simulation are determined only when Roll $\Phi$=0° and geodetic latitude $\lambda$=35° that indicates a location in the Northern Hemisphere. In the Southern Hemisphere, the same algorithm can be used with a negative geodetic latitude value.

Figure 10:
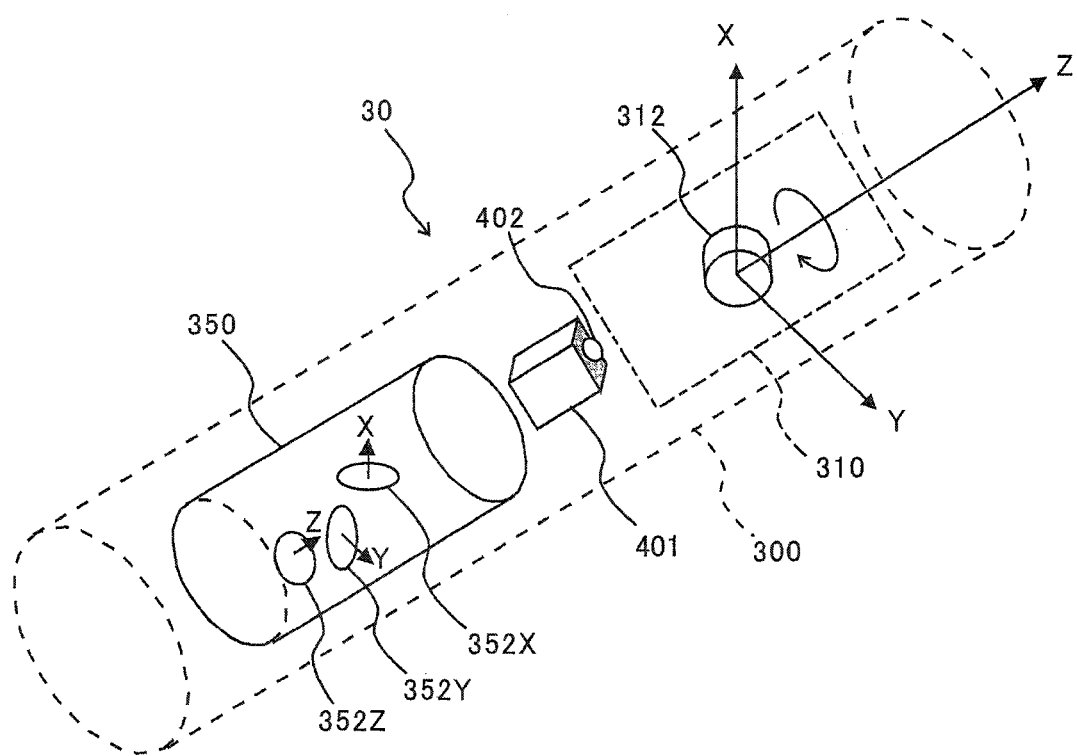
FIG. 10 illustrates one exemplary system including a single gyroscope and three orthogonal axis accelerometers according to the disclosure herein.
Figure 11:
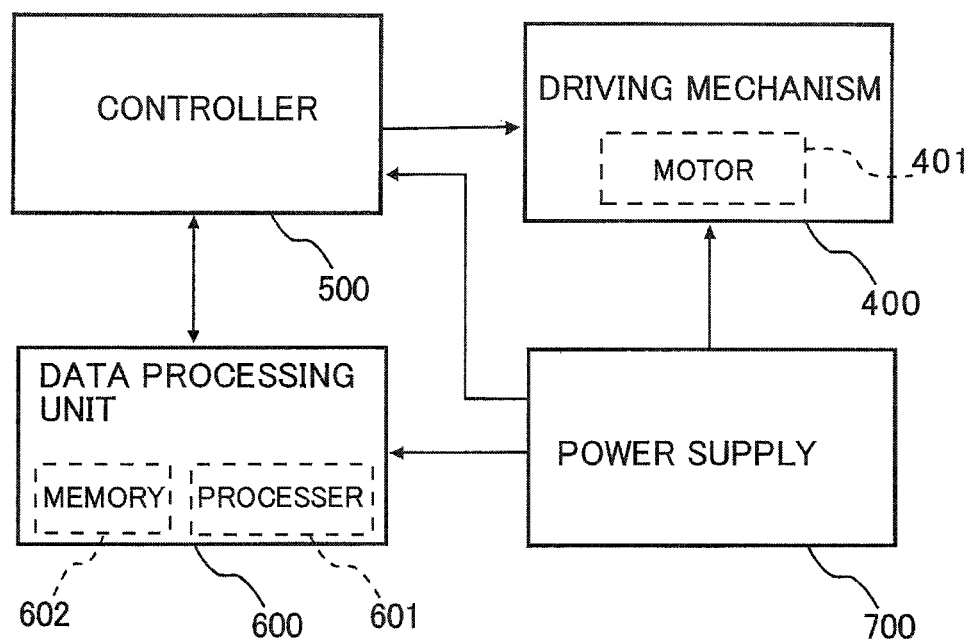
FIG. 11 shows a block diagram of electric system of the system according to the disclosure herein.

FIG. 10 illustrates one exemplary system including a single gyroscope and three orthogonal axis accelerometers according to the disclosure herein. FIG. 11 shows a block diagram of electric system of the sensor system. The sensor system 30 includes a housing 300, a gyroscope unit 310 including a single gyroscope 312, an accelerometer module 350 including three orthogonal axis accelerometers 352X, 352Y, 352Z, a driving mechanism 400 for the gyroscope 312 to flip and/or rotate an input axis of the gyroscope 312. The driving mechanism 400 flips and/or rotates the gyroscope 312 using a single motor 401 (preferably a step motor) and gears to transport the rotating force to a rotation axis of the gyroscope. By flipping and/or rotating the gyroscope 312, the input axis of the gyroscope 312 can be aligned to an X-axis and a Y-axis of a orthogonal XYZ coordinates system (measurement coordinate system). The X-axis may be set as a reference axis for calculating an azimuth using the aforementioned algorism and formula. The gyroscope 312 measures two earth rate components orthogonal to each other with respect to the X-axis and Y-axis. The two earth rate components are output from the gyroscope unit 310 to the data processing unit 600 and used for calculating a ratio data between the two earth rate components. The ratio data may be directly output from the gyroscope unit 310 to the data processing unit 600.

The sensor system 30 also includes a controller 500 for the driving mechanism, a data processing unit 600 and a power supply unit 700. The data processing unit 600 includes a computer having a processor 601 and a memory 602. The memory 602 stores a program having instructions for the azimuth measurements described above. The gyroscope 312, the accelerometers 352X, 352Y, 352Z, the driving mechanism 400, the controller 500 for the driving mechanism 400, the data processing unit 600 and the power supply unit 700 are installed in the housing 300.

An angle position sensor 402 may be preferably provided in order to detect a rotation angle position of a rotation axis of the motor 401 or the gyroscope. By using the detected rotation angle position, the angular orientation of input axis of the gyroscope 312 can be identified. The angle position sensor 402 may be used to monitor an angular rotation position of the motor axis. This monitoring the angular rotation position allows the sensor system 30 to return the gyroscope 312 at a home position and set the input axis of the gyroscope 312 parallel to a predetermined home angular orientation (original angular orientation), whenever the system power is turned on. In addition, it is important to monitoring the angular rotation position during the azimuth measurement for reliability of the sensor system.

Figure 12:
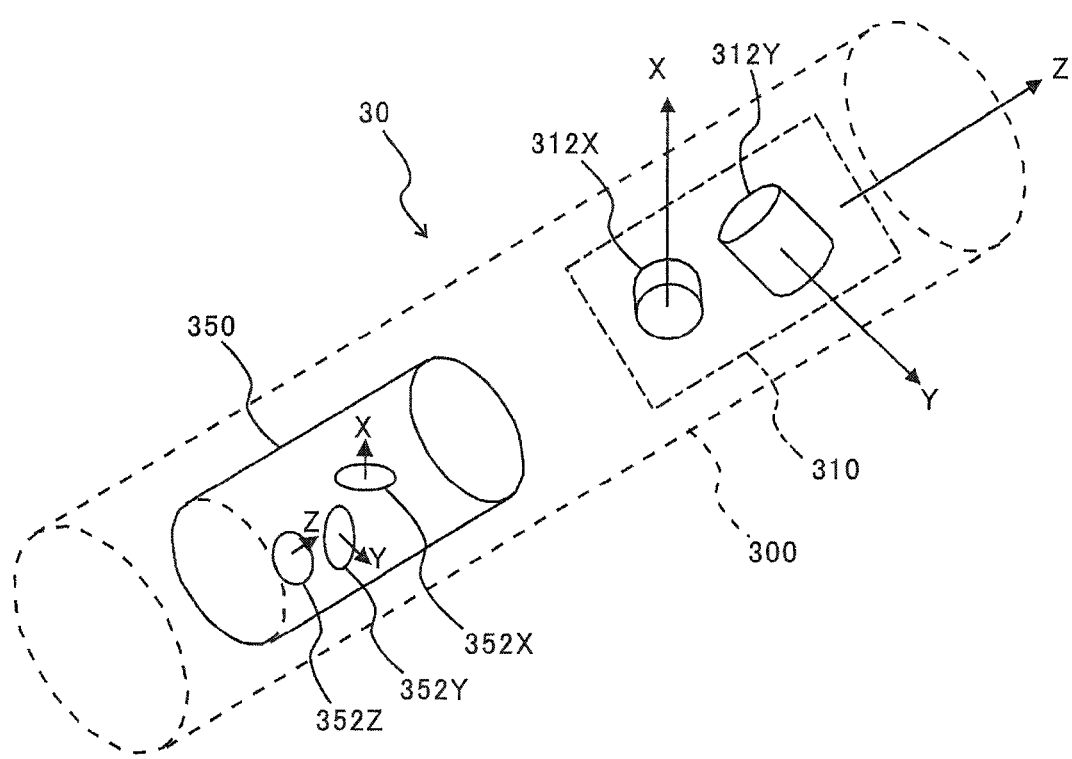
FIG. 12 illustrates another exemplary system including two orthogonal axis gyroscopes and three orthogonal axis accelerometers according to the disclosure herein.

In another embodiment of the present system, it is possible to use a gyroscope unit including two orthogonal axis gyroscope 312X, 312Y as shown in FIG. 12. One of the two orthogonal earth rate components is measured by the gyroscope 312X with the input axis aligned to the X-axis, and another earth rate components is measured by the gyroscope 312Y with the input axis aligned to the Y-axis. In this embodiment, the driving mechanism 401 in FIG. 11 can be omit in the sensor system 30.

There are many variety types of gyro sensors used for the azimuth measurements including a MEMS-type gyroscope. Among the variety types of gyro sensors, a MEMS-type gyroscope of ring oscillating type may be preferably used in terms of the accuracy, measurement robustness in environmental vibration conditions. The three accelerometers 352X, 352Y, 352Z may be either conventional Q-flex types or MEMS type accelerometers.

Figure 13:
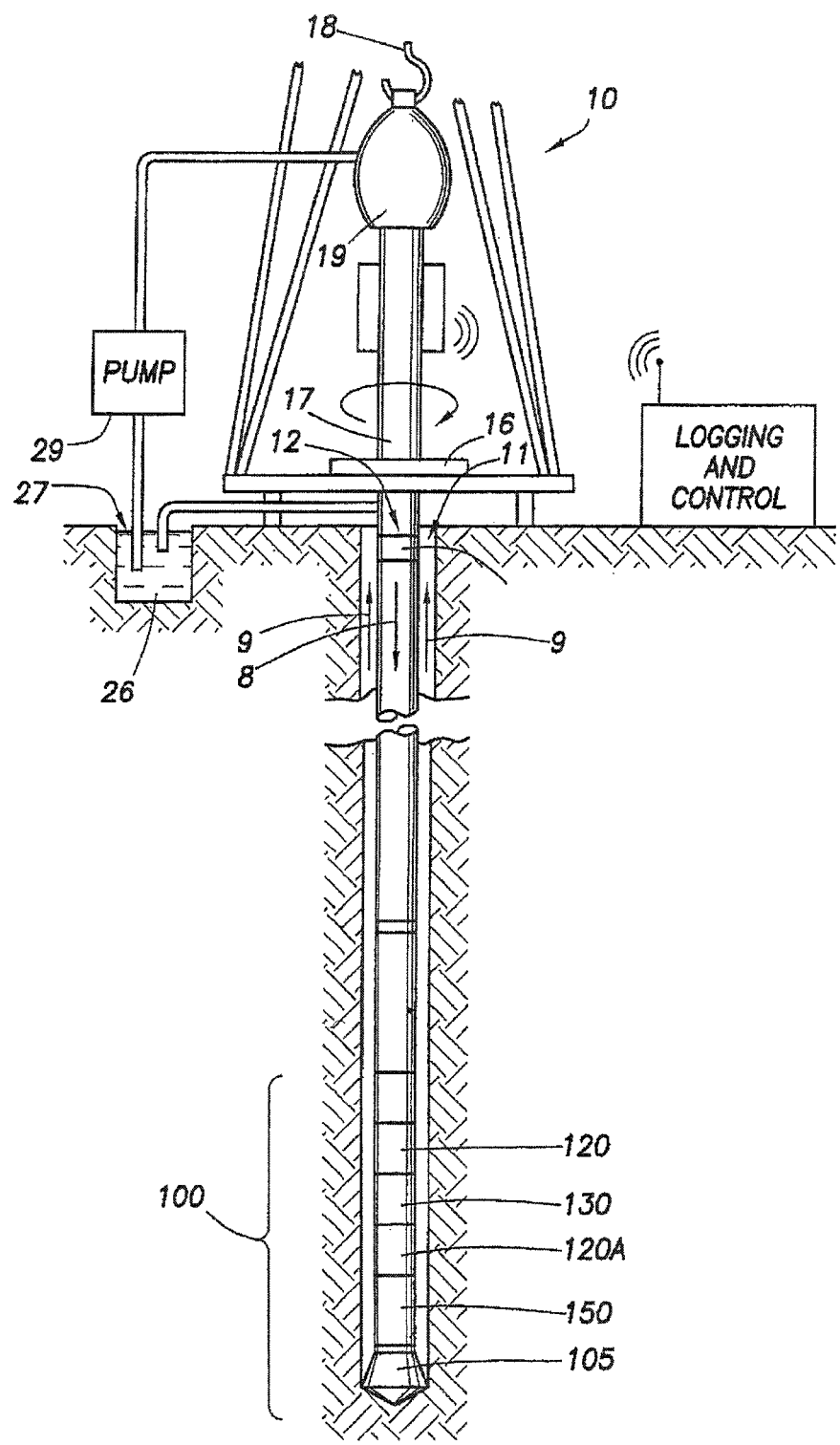
FIG. 13 illustrates a wellsite system in which the present invention can be employed, according to the disclosure herein.

FIG. 13 illustrates a wellsite system in which the present invention can be employed. The wellsite can be onshore or offshore. In this exemplary system, a borehole 11 is formed in subsurface formations by rotary drilling in a manner that is well known. Embodiments of the invention can also use directional drilling, as will be described hereinafter.

A drill string 12 is suspended within the borehole 11 and has a bottom hole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well known manner, the drilling fluid lubricates the drill bit 105 and carries formation cuttings up to the surface as it is returned to the pit 27 for recirculation. The bottom hole assembly 100 of the illustrated embodiment a logging-while-drilling (LWD) module 120, a measuring-while-drilling (MWD) module 130, a roto-steerable system and motor, and drill bit 105.

The LWD module 120 is housed in a special type of drill collar, as is known in the art, and can contain one or a plurality of known types of logging tools. It will also be understood that more than one LWD and/or MWD module can be employed, e.g. as represented at 120A. (References, throughout, to a module at the position of 120 can alternatively mean a module at the position of 120A as well.) The LWD module includes capabilities for measuring, processing, and storing information, as well as for communicating with the surface equipment. In the present embodiment, the LWD module includes a pressure measuring device.

The MWD module 130 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module includes one or more of the following types of measuring devices: a weight-on-bit measuring device, a torque measuring device, a vibration measuring device, a shock measuring device, a stick slip measuring device, a direction measuring device, and an inclination measuring device.

A particularly advantageous use of the system hereof is in conjunction with controlled steering or "directional drilling." In this embodiment, a roto-steerable subsystem 150 is provided. Directional drilling is the intentional deviation of the wellbore from the path it would naturally take. In other words, directional drilling is the steering of the drill string so that it travels in a desired direction. Directional drilling is, for example, advantageous in offshore drilling because it enables many wells to be drilled from a single platform. Directional drilling also enables horizontal drilling through a reservoir. Horizontal drilling enables a longer length of the wellbore to traverse the reservoir, which increases the production rate from the well. A directional drilling system may also be used in vertical drilling operation as well. Often the drill bit will veer off of an planned drilling trajectory because of the unpredictable nature of the formations being penetrated or the varying forces that the drill bit experiences. When such a deviation occurs, a directional drilling system may be used to put the drill bit back on course. A known method of directional drilling includes the use of a rotary steerable system ("RSS"). In an RSS, the drill string is rotated from the surface, and downhole devices cause the drill bit to drill in the desired direction. Rotating the drill string greatly reduces the occurrences of the drill string getting hung up or stuck during drilling. Rotary steerable drilling systems for drilling deviated boreholes into the earth may be generally classified as either "point-the-bit" systems or "push-the-bit" systems. In the point-the-bit system, the axis of rotation of the drill bit is deviated from the local axis of the bottom hole assembly in the general direction of the new hole. The hole is propagated in accordance with the customary three point geometry defined by upper and lower stabilizer touch points and the drill bit. The angle of deviation of the drill bit axis coupled with a finite distance between the drill bit and lower stabilizer results in the non-collinear condition required for a curve to be generated. There are many ways in which this may be achieved including a fixed bend at a point in the bottom hole assembly close to the lower stabilizer or a flexure of the drill bit drive shaft distributed between the upper and lower stabilizer. In its idealized form, the drill bit is not required to cut sideways because the bit axis is continually rotated in the direction of the curved hole. Examples of point-the-bit type rotary steerable systems, and how they operate are described in U.S. Patent Application Publication Nos. 2002/0011359; 2001/0052428 and U.S. Pat. Nos. 6,394,193; 6,364,034; 6,244,361; 6,158,529; 6,092,610; and 5,113,953 all herein incorporated by reference. In the push-the-bit rotary steerable system there is usually no specially identified mechanism to deviate the bit axis from the local bottom hole assembly axis; instead, the requisite non-collinear condition is achieved by causing either or both of the upper or lower stabilizers to apply an eccentric force or displacement in a direction that is preferentially orientated with respect to the direction of hole propagation. Again, there are many ways in which this may be achieved, including non-rotating (with respect to the hole) eccentric stabilizers (displacement based approaches) and eccentric actuators that apply force to the drill bit in the desired steering direction. Again, steering is achieved by creating non co-linearity between the drill bit and at least two other touch points. In its idealized form the drill bit is required to cut side ways in order to generate a curved hole. Examples of push-the-bit type rotary steerable systems, and how they operate are described in U.S. Pat. Nos. 5,265,682; 5,553,678; 5,803,185; 6,089,332; 5,695,015; 5,685,379; 5,706,905; 5,553,679; 5,673,763; 5,520,255; 5,603,385; 5,582,259; 5,778,992; 5,971,085 all herein incorporated by reference.

The preceding description has been presented only to illustrate and describe certain embodiments. It is not intended to be exhaustive or to limit the invention to any precise form disclosed. Many modifications and variations are possible in light of the above teaching.

The embodiments and aspects were chosen and described in order to best explain principles of the invention and its practical applications. The preceding description is intended to enable others skilled in the art to best utilize the principles in various embodiments and aspects and with various modifications as are suited to the particular use contemplated. It is intended that the scope of the invention be defined by the following claims.

What is claimed is:

1. A method for determining an azimuth measurement of a downhole wellsite system using a gyroscope unit, comprising:
    acquiring a ratio value between two earth rate components orthogonal to each other by using the gyroscope unit at a downhole measuring position;
    acquiring three gravity vector components orthogonal to each other at the downhole measuring position;
    determining an azimuth with respect to a reference axis predetermined in the gyroscope unit, based on the ratio value, the three gravity vector components and a geodetic latitude of the downhole measuring position; and
using the azimuth for a wellbore survey, or navigation of the wellsite system from the downhole measuring position;
wherein the azimuth is determined by using:

$$\sigma = \pm \delta \pm \varepsilon(\lambda)$$
$$= \pm \arccos\left(\frac{G_z \Omega'_x}{\sqrt{(1-G_x^2)(G_z^2 + (G_x\Omega'_x + G_y\Omega'_y)^2)}}\right) \pm$$
$$\arccos\left(\sqrt{\frac{(G_y\Omega'_x - G_x\Omega'_y)^2 - \cos(\lambda)^2}{\cos(\lambda)^2[(G_y\Omega'_x - G_x\Omega'_y)^2 - 1]}}\right)$$

where X-axis and Y-axis of an orthogonal coordinates system are defined for measuring the two earth rate components, the X-axis is set as the reference axis, δ represents an angle between the projection of X-axis onto the horizontal plane and a fourth intersection line between the earth rate plane and the horizontal plane, ε represents an angle between the third intersection line and the fourth intersection line, σ represents the azimuth, $\Omega'_x$, and $\Omega'_y$ and represent components along the X-axis and the Y-axis of the normalized earth rate projection vector on an XY-plane as the measurement coordinate plane, $G_x$, $G_y$, and $G_z$ represent the normalized gravity vector components, and λ represents the geodetic latitude having a plus value in the Northern Hemisphere and a minus value in the Southern Hemisphere,
wherein the azimuth is further determined by using one of equations (30-1) - (30-8) listed in Table I, based on conditions for selecting an azimuth formula with respect to a normal Ω unit vector PΩ of the earth rate plane, a unit gravity vector G, a unit vector $L_{O\_d}$ of the fourth intersection line, and a unit vector X' of the X-axis projected onto the horizontal plane.

2. The method according to claim 1, wherein the two earth rate components are measured by a single gyroscope rotatable to align an input axis to each of two axes orthogonal to each other.

3. The method according to claim 2, wherein one of the two earth rate components is measured by a first gyroscope with an input axis aligned to a first axis and the other earth rate component is measured by a second gyroscope with an input axis aligned to a second axis orthogonal to the first axis.

4. The method according to claim 3, wherein the gyroscope unit comprises one or two MEMS-type gyroscopes.

5. A system for determining an azimuth measurement of a downhole wellsite system, comprising:
a housing;
a gyroscope unit including one or two gyroscopes;
three orthogonal axis accelerometers;
a data processing unit; and
a power supply unit,
wherein the data processing unit comprises a computer having a processor and a memory, and
wherein the memory stores a program having instructions for:
acquiring a ratio value between two earth rate components orthogonal to each other by using the gyroscope unit at a downhole measuring position;
acquiring three gravity vector components orthogonal to each other at the downhole measuring position;
determining an azimuth with respect to a reference axis predetermined in the gyroscope unit, based on the ratio value, the three gravity vector components and a geodetic latitude of the downhole measuring position; and
using the azimuth for a wellbore survey, or navigation of the wellsite system from the downhole measuring position;
wherein the azimuth is determined by using:

$$\sigma = \pm \delta \pm \varepsilon(\lambda)$$
$$= \pm \arccos\left(\frac{G_z \Omega'_x}{\sqrt{(1-G_x^2)(G_z^2 + (G_x\Omega'_x + G_y\Omega'_y)^2)}}\right) \pm$$
$$\arccos\left(\sqrt{\frac{(G_y\Omega'_x - G_x\Omega'_y)^2 - \cos(\lambda)^2}{\cos(\lambda)^2[(G_y\Omega'_x - G_x\Omega'_y)^2 - 1]}}\right)$$

where X-axis and Y-axis of an orthogonal coordinates system are defined for measuring the two earth rate components, the X-axis is set as the reference axis, §represents an angle between the projection of X-axis onto the horizontal plane and a fourth intersection line between the earth rate plane and the horizontal plane, ε represents an angle between the third intersection line and the fourth intersection line, σ represents the azimuth, $\Omega'_x$, and $\Omega'_y$ represent components along the X-axis and the Y-axis of the normalized earth rate projection vector on an XY-plane as the measurement coordinate plane, $G_x$, $G_y$, and $G_z$ represent the normalized gravity vector components, and λ, represents the geodetic latitude having a plus value in the Northern Hemisphere and a minus value in the Southern Hemisphere,
wherein the azimuth is determined by using one of equations (30-1) - (30-8) listed in Table I, based on conditions for selecting an azimuth formula with respect to a normal unit vector PΩ of the earth rate plane, a unit gravity vector G, a unit vector $LO\_d$ of the fourth intersection line, and a unit vector X' of the X-axis projected onto the horizontal plane.

6. The system according to claim 5, wherein the gyroscope unit comprises a single gyroscope rotatable to align an input axis to each of two axes orthogonal to each other.

7. The system according to claim 5, wherein the gyroscope unit comprises a first gyroscope with an input axis aligned to a first axis and a second gyroscope with an input axis aligned to a second axis orthogonal to the first axis.

8. The system according to claim 5, wherein the gyroscope unit comprises one or two MEMS-type gyroscopes.

* * * * *